(12) United States Patent
Pang et al.

(10) Patent No.: US 10,536,860 B2
(45) Date of Patent: Jan. 14, 2020

(54) MULTI-HOP WIRELESS NETWORK PLANNING

(71) Applicant: Facebook, Inc., Menlo Park, CA (US)

(72) Inventors: Guan Pang, Menlo Park, CA (US); Jing Huang, Menlo Park, CA (US); Balmanohar Paluri, Mountain View, CA (US); Brian Karrer, San Francisco, CA (US); Ismail Onur Filiz, El Cerrito, CA (US); Birce Tezel, Berkeley, CA (US); Nicolas Emilio Stier Moses, Palo Alto, CA (US); Vishakan Ponnampalam, Palo Alto, CA (US); Timothy Eric Danford, Redwood City, CA (US)

(73) Assignee: Facebook, Inc., Menlo Park, CA (US)

(*) Notice: Subject to any disclaimer, the term of this patent is extended or adjusted under 35 U.S.C. 154(b) by 115 days.

(21) Appl. No.: 15/592,100

(22) Filed: May 10, 2017

(65) Prior Publication Data
US 2018/0332480 A1   Nov. 15, 2018

(51) Int. Cl.
*G06T 15/00* (2011.01)
*H04W 16/18* (2009.01)
(Continued)

(52) U.S. Cl.
CPC ............. *H04W 16/18* (2013.01); *H04L 45/12* (2013.01); *H04W 40/20* (2013.01)

(58) Field of Classification Search
CPC ............................... H04W 16/18; H04L 45/16
(Continued)

(56) References Cited

U.S. PATENT DOCUMENTS 9,014,953 B2 * 4/2015 Breed .................... G07C 5/008
                                                              180/271
9,443,358 B2 * 9/2016 Breed .................... G07C 5/008
(Continued)

OTHER PUBLICATIONS

Frieze A, Kleinberg J, Ravi R, Debany W. Line-of-sight networks. Combinatorics, Probability and Computing. Mar. 2009;18(1-2):145-63.*

(Continued)

*Primary Examiner* — Phu K Nguyen
(74) *Attorney, Agent, or Firm* — Baker Botts L.L.P.

(57) ABSTRACT

In one embodiment, a method includes accessing a point cloud comprising several points, wherein each point corresponds to a location on a surface of an object located in three-dimensional space; determining whether each point in the point cloud is part of a linear structure, a planar structure, or a volumetric structure; identifying a plurality of point clusters, wherein each point cluster comprises one or more points that are located within a grid segment on a two-dimensional grid derived from the three-dimensional space; determining, for each point cluster, whether the point cluster represents a vertical-linear structure or a portion of a vertical-linear structure; identifying one or more point-cluster pairs, wherein each point-cluster pair includes two point clusters corresponding to one or more vertical-linear structures within a threshold distance in the three-dimensional space; and determining, for each point-cluster pair, whether a line-of-sight exists between each point-cluster in the point-cluster pair.

20 Claims, 8 Drawing Sheets

(51) Int. Cl.
*H04L 12/721* (2013.01)
*H04W 40/20* (2009.01)

(58) Field of Classification Search
USPC .......................................................... 345/419
See application file for complete search history.

(56) References Cited

U.S. PATENT DOCUMENTS

| | | | |
|---|---|---|---|
| 9,820,209 B1 * | 11/2017 | Agee .................... | H04B 7/0413 |
| 9,888,353 B2 * | 2/2018 | Reed ....................... | H04W 8/02 |
| 9,961,666 B2 * | 5/2018 | Ubeda Castellanos ...................... | |
| | | | G01S 5/0215 |
| 10,103,801 B2 * | 10/2018 | Bennett .............. | H04B 7/15507 |
| 10,149,172 B2 * | 12/2018 | Cheng ................... | H04W 16/18 |

OTHER PUBLICATIONS

Yang PP, Putra SY, Li W. Viewsphere: a GIS-based 3D visibility analysis for urban design evaluation. Environment and Planning B: Planning and Design. Dec. 2007;34(6):971-92.*

Nurunnabi A, Belton D, West G. Robust statistical approaches for local planar surface fitting in 3D laser scanning data. ISPRS journal of photogrammetry and Remote Sensing. Oct. 1, 2014;96:106-22.*

Maalek R, Lichti DD, Ruwanpura JY. Robust Segmentation of Planar and Linear Features of Terrestrial Laser Scanner Point Clouds Acquired from Construction Sites. Sensors. Mar. 8, 2018;18(3):819.*

* cited by examiner

MULTI-HOP WIRELESS NETWORK PLANNING

TECHNICAL FIELD

This disclosure generally relates to wireless communication networks.

BACKGROUND

A multi-hop wireless network may facilitate the communication of data where wired communication is unavailable, impractical, or impossible. For example, a multi-hop wireless network may serve as a wireless backhaul network connecting a core or backbone network to one or more customer networks. A customer network may include customer equipment (CE)—such as Wi-Fi access points (APs), cellular base stations (such as femtocells), and related equipment or other CE—providing wireless or wired connectivity to one or more client devices. A client device may be a desktop or laptop computer, tablet, mobile telephone, appliance, or other client device.

A multi-hop wireless network may include multiple wirelessly interconnected network nodes. A wireless connection between two network nodes may be a hop, and data may be communicated wirelessly through the network from one edge to another along one or more network paths traversing series of network nodes and hops. All or some of the network nodes may be at fixed locations. For example, all or some of the network nodes may be affixed to street lamps, utility poles, other street furniture, or building exteriors. All or some of the network nodes may act as distribution nodes (DNs) or customer nodes (CNs). A DN may wirelessly communicate with CNs or other DNs to relay data through the network. One or more DNs may also communicate with one or more edge devices of a core or backbone network to connect the multi-hop wireless network to the core or backbone network. A CN may communicate with DNs and CEs to connect a customer network to the multi-hop wireless network.

SUMMARY OF PARTICULAR EMBODIMENTS

Particular embodiments involve a fully-automated network planning system that may aid in the deployment of multi-hop wireless networks. The network planning system may be divided into two main steps: (1) identifying potential network node sites; and (2) designing the multi-hop wireless network. Identifying potential network node sites may comprise (i) creating a point cloud from LiDAR (Light Detection and Ranging) data; (ii) processing the point cloud into useful data; (iii) detecting locations that are capable of supporting a network node (e.g., light poles, telephone poles); and (iv) identifying lines of sight between these locations. Designing the multi-hop wireless network may comprise (i) modelling the multi-hop wireless network as a network flow problem, and (ii) searching feasible combinations of binary values from the network flow model. Designing the multi-hop wireless network may also involve modeling the multi-hop network as a network flow problem on a network N (V, A) where the nodes V represent network nodes, customer nodes, point-of-presence locations, and demand locations.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Particular embodiments involve a fully-automated network planning system that may aid in the deployment of multi-hop wireless networks. The network planning system may be divided into two main steps: (1) identifying potential network node sites; and (2) designing the multi-hop wireless network. Identifying potential network node sites may comprise (i) creating a point cloud from LiDAR (Light Detection and Ranging) data; (ii) processing the point cloud into useful data; (iii) detecting locations that are capable of supporting a network node (e.g., light poles, telephone poles); and (iv) identifying lines of sight between these locations. Designing the multi-hop wireless network may comprise (i) modelling the multi-hop wireless network as a network flow problem, and (ii) searching feasible combinations of binary values from the network flow model. Designing the multi-hop wireless network may involve modeling the multi-hop network as a network flow problem on a network N (V, A) where the nodes V represent network nodes, customer nodes, point-of-presence locations, and demand locations.

In particular embodiments, to install and ignite network nodes in a multi-hop wireless network, the physical locations where the network nodes will be installed are identified. The physical locations may be street furniture (such as lampposts), customized structures made specifically to house network nodes, or a combination of the two. The identification of the physical locations can be done in a systematic way with network-deployment tools. Such tools have several functions, such as (1) predicting which individual links need to be "ignited" (which can provide the initial trunking of the network topology); (2) computing GPS locations, heights, and azimuth/elevation tilts for optimal network deployment and performance; and (3) generating a deployment plan for the installer(s).

Figure 1:
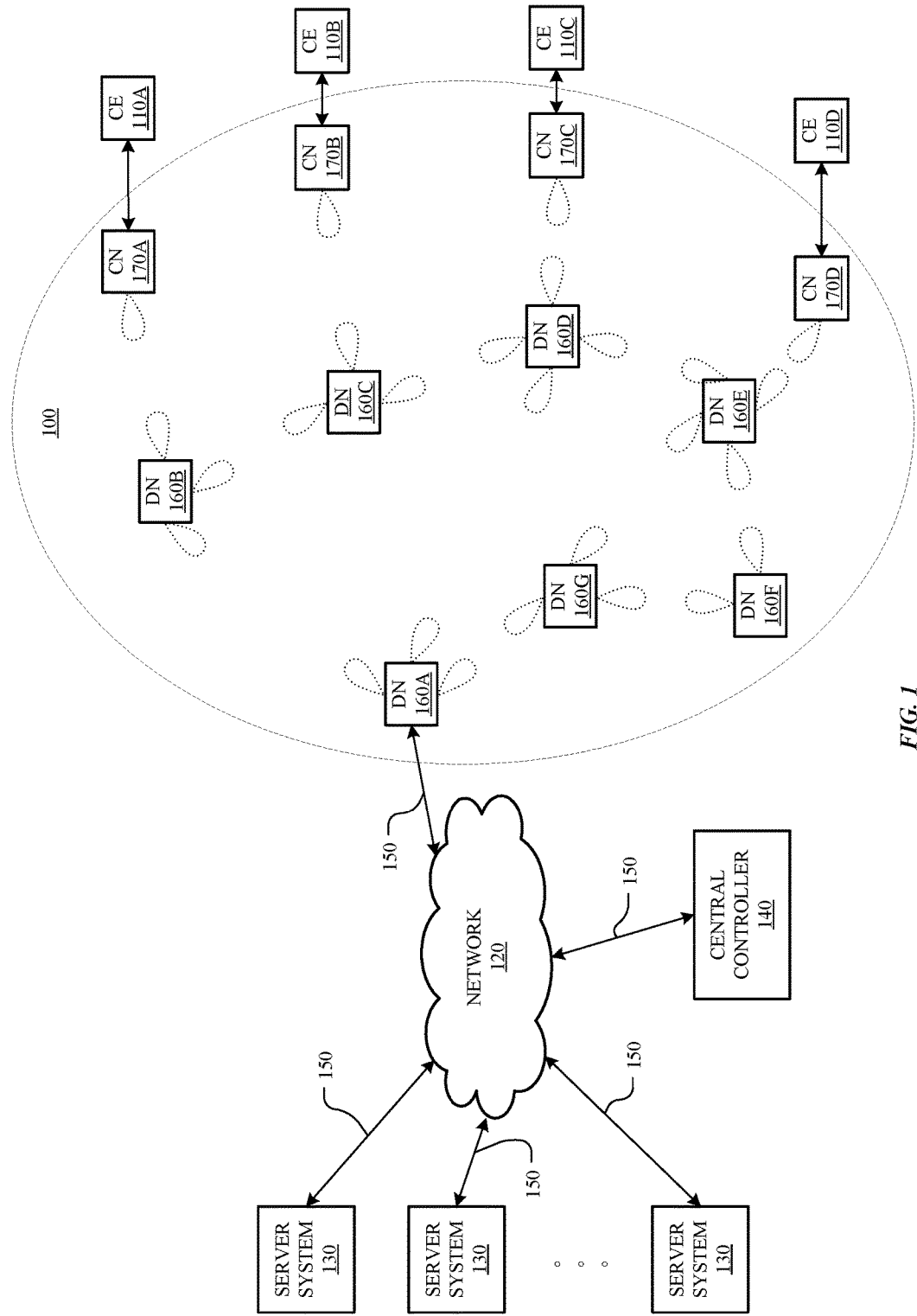
FIG. 1 illustrates an example multi-hop wireless network.

FIG. 1 illustrates an example multi-hop wireless network 100. In the example of FIG. 1, multi-hop wireless network 100 connects CE 110 at customer premises (such as residences or places of businesses) to a core or backbone network 120 (which may include one or more portions of the Internet). Network 120 connects multi-hop wireless network 100 to one or more server systems 130. Network 120 may also connect central controller 140 to multi-hop wireless network 100. As described below, a connection between central controller 140 and a network node of multi-hop wireless network 100 may be an in-band connection or out-of-band connection. Links 150 may connect multi-hop wireless network 100, server systems 130, and central controller 140 to network 110. This disclosure contemplates any suitable links 150 for these connections. For example, one or more links 150 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links, where appropriate. In particular embodiments, one or more links 150 may each include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the PSTN, a 2G, 3G, or 4G mobile-telecommunications network, a satellite communications network, another link 150, or a combination of two or more such links 150, where appropriate. Links 150 are not necessarily the same throughout the network environment of FIG. 1. One link 150 may differ from another in one or more respects. Although the example of FIG. 1 is described and illustrated with a particular network environment including a particular number of particular systems and components arranged in a particular manner, this disclosure contemplates any suitable network environment including any suitable number of any suitable systems and components arranged in any suitable manner. For example, two or more of multi-hop wireless network 100, server systems 130, or central controller 140 may be connected to each other directly, bypassing network 120. As another example, two or more of multi-hop wireless network 100, server systems 130, or central controller 140 may be physically or logically co-located with each other in whole or in part.

A connection between central controller 140 and a network node of multi-hop wireless network 100 may be an in-band connection or out-of-band connection. An in-band connection between central controller 140 and a network node of multi-hop wireless network 100 is a connection that traverses network 120 and wireless network 100. An out-of-band connection between central controller 140 and a network node of multi-hop wireless network 100 is a connection that bypasses in whole or in part network 120 or multi-hop wireless network 100. For example, in FIG. 1, an in-band connection between central controller 140 and CN 170A may traverse the following: (1) link 150 between central controller 140 and network 120; (2) network 120; (3) link 150 between network 120 and DN 160A; (4) DN 160A; (5) a direct wireless connection between DN 160A and DN 160B; (5) DN 160B; and (6) a direct wireless connection between DN 160B and CN 170A. An out-of-band connection between central controller 140 and CN 170A may include one or more wireless connections between them through one or more portions of a 2G, 3G, or 4G mobile telecommunications network, bypassing one or more of the following: (1) link 150 between central controller 140 and network 120; (2) network 120; (3) link 150 between network 120 and DN 160A; or (4) multi-hop wireless network 100. Although this disclosure describes particular in-band connections, this disclosure contemplates any suitable in-band connections. Similarly, although this disclosure describes particular out-of-band connections, this disclosure contemplates any suitable out-of-band connections.

A server system 130 may provide services (such as web services) to client and other devices and systems. For example, a server system 130 may include one or more web servers, news servers, mail servers, message servers, advertising servers, file servers, application servers, exchange servers, database servers, proxy servers, other suitable servers, or a suitable combination thereof. A server system 130 may include hardware, software, or embedded logic components or a combination of two or more such components for carrying out the functions implemented or supported by server system 130. In addition, a server system 130 may include one or more servers and be a unitary server system or a distributed server system spanning multiple computer systems or multiple datacenters. Although this disclosure describes and illustrates particular server systems, this disclosure contemplates any suitable server systems.

Central controller 140 may act as a central controller for multi-hop wireless network 100, which may include coordinating ignition of DNs 160 and CNs 170, as described below. Central controller 140 may include hardware, software, or embedded logic components or a combination of two or more such components for carrying out its functions. In addition, central controller 140 may include one or more servers and be a unitary computer system or a distributed computer system spanning multiple computer systems or multiple datacenters. Central controller 140 may be connected to multi-hop wireless network 100 by network 120. In addition or as an alternative, central controller 140 may where appropriate connect to one or more network nodes of multi-hop wireless network 100 directly, for example, through out-of-band signaling by 2G, 3G, or 4G mobile telecommunications. Communication between central controller 140 and a network node of multi-hop through network 120 may be referred to as in-band. Although this disclosure describes and illustrates a particular central controller 140, this disclosure contemplates any suitable central controller 140.

In the example of FIG. 1, multi-hop wireless network 100 includes multiple DNs 160 and CNs 170. A DN 160 wirelessly communicates with one or more CNs 170 or one or more other DNs 160 to relay data through multi-hop wireless network 100. DN 160A also communicates through a link 150 with one or more edge devices of network 120 to connect multi-hop wireless network 100 to network 120, providing a point-of-presence (PoP) for multi-hop wireless network 100 on network 120. A CN 170 communicates with one or more DNs 160 and CE 110 to connect a customer network to the multi-hop wireless network. One or more wireline or other suitable links may connect a CN 170 to CE 110. A CE 100 may be part of a customer network located for example at a customer premises and may include one or more Wi-Fi APs, cellular base stations (such as femtocells), and related equipment or other CEs providing wireless or wired connectivity to one or more client devices. A client device may be an electronic device including hardware, software, or embedded logic components or a combination of two or more such components designed to carry out particular functions implemented or supported by the client device. For example, a client device may be a desktop or laptop computer, tablet, e-book reader, GPS device, camera, mobile telephone, appliance, augmented-reality or virtual-reality device, another suitable client device, or a suitable combination thereof. This disclosure contemplates any suitable client devices.

As described above, multi-hop wireless network 100 includes multiple DNs 160 and CNs 170. Wireless communication in multi-hop wireless network 100 may be point-to-point, and DNs 160 and CNs 170 may communicate wirelessly with each other in one or more frequency bands at or around 60 GHz. A DN 160 or CN 170 may have a maximum range of approximately 1.5 kilometers, but may typically communicate with other DNs 160 or CNs within approximately 300-300 meters. All or some of DNs 160 and CNs 170 the network nodes may be at fixed locations. For example, all or some of DNs 160 and CNs 170 may be affixed to street lamps, utility poles, other street furniture, or building exteriors.

A network node of multi-hop wireless network 100 may include one or more antenna arrays that are each capable of beamforming to direct signal transmission or reception by network node. A single antenna array capable of beamforming may be referred to as a sector. If a network node has multiple sectors, they will likely face different directions. For example, a network node affixed to a street pole could have four separate antenna arrays on it, with one facing north, one facing east, one facing south, and one facing west. To aim a sector for transmission or reception, the beamforming weight of the antenna array constituting the sector may be adjusted. A micro-route is a gross reflection or line of site between two sectors. A nano-route is a fine reflection or line of site between two sectors. Typically, a micro-route between two sectors has several possible nano-routes. Some of those nano-routes will provide better link capacity between the two sectors, and some of those nano-routes will interfere more with neighboring nodes. In the example of FIG. 1, the directions of the sectors of DNs 160 and CNs 170 for transmission and reception are shown as lobes with dashed lines. Each of these lobes represents a sector's main lobe (e.g. the direction of the greatest transmission power or reception sensitivity). A sector may also have side lobes and nulls, which are not shown in FIG. 1. In the example of FIG. 1, DN 160A has sectors aimed at DN 160B, DN 160D, and DN 160G; DN 160B has sectors aimed at DN 160A, DN 160C, and CN 170A; DN 160C has sectors aimed at DN 160B, DN 160D, and CN 170B; DN 160D has sectors aimed at DN 160A, DN 160C, DN 160E, and CN 170C; DN 160E has sectors aimed at DN 160D, DN 160F, DN 160G, and CN 170D; DN 160F has sectors aimed at DN 160E and DN 160G; DN 160G has sectors aimed at DN 160A, DN 160E, and DN 160F; CN 170A has a sector aimed at DN 160B; CN 170B has a sector aimed at DN 160C; CN 170C has a sector aimed at DN 160D; and CN 170D has a sector aimed at DN 160E. As described below, the sectors of DNs 160 and CNs 170 may be dynamically re-directed by changing the beamforming weights of the respective antenna arrays. Moreover, as further described below, the sectors of particular DNs 160 and CNs 170 may be dynamically re-directed in response to particular events. Although this disclosure describes and illustrates a particular example multi-hop wireless network with a particular number of particular network nodes in a particular arrangement with particular numbers of particular beamforming antenna arrays aimed in particular directions, this disclosure contemplates any suitable multi-hop wireless network with any suitable number of any suitable network nodes in any suitable arrangement with any suitable numbers of any suitable beamforming antenna arrays aimed in any suitable directions.

A multi-hop wireless network may require network nodes to be installed on street furniture (e.g., utility poles, buildings). Choosing locations for the nodes may have one or more constraints, including installing nodes close enough together to support wireless data transmission and making sure that each node has a line of sight to at least one other node. Before a multi-hop wireless network may be deployed, potential network node sites may first need to be determined. Identifying potential network node sites and then selecting sites for installing network nodes may be referred to as network planning. The initial step of the network planning process may include performing a site survey to generate a list of potential sites for network nodes. Traditionally, this has been done by humans performing a manual inspection of a deployment area and manually identifying potential installation locations and estimating radio-frequency (RF) propagation ranges. The network planning system described herein automates this process. To identify potential node sites (e.g., telephone poles, buildings), the network planning system may survey a region (e.g., a geographical area) using LiDAR, a remote sensing technology that can measure the distance to any surface using lasers. LiDAR may stand for "Light Detection and Ranging," "Light Imaging, Detection, and Ranging," or may be a portmanteau of "light and radar." The output of the LiDAR site survey may be a point cloud. The point cloud may consist of a list of points, where each point in the point cloud is represented by a three-dimensional coordinate (e.g., x, y, z), and, in particular embodiments, RGB color values. This list is simply a long list of coordinates without labels or other annotations of what each point represents. Points are stored in an unordered data structure and can be permuted in any way without changing the data the cloud represents. Two points that are close to each other in real life may be nowhere near each other on the list. This makes it almost impossible to determine what a given point in the point cloud represents.

Figure 2:
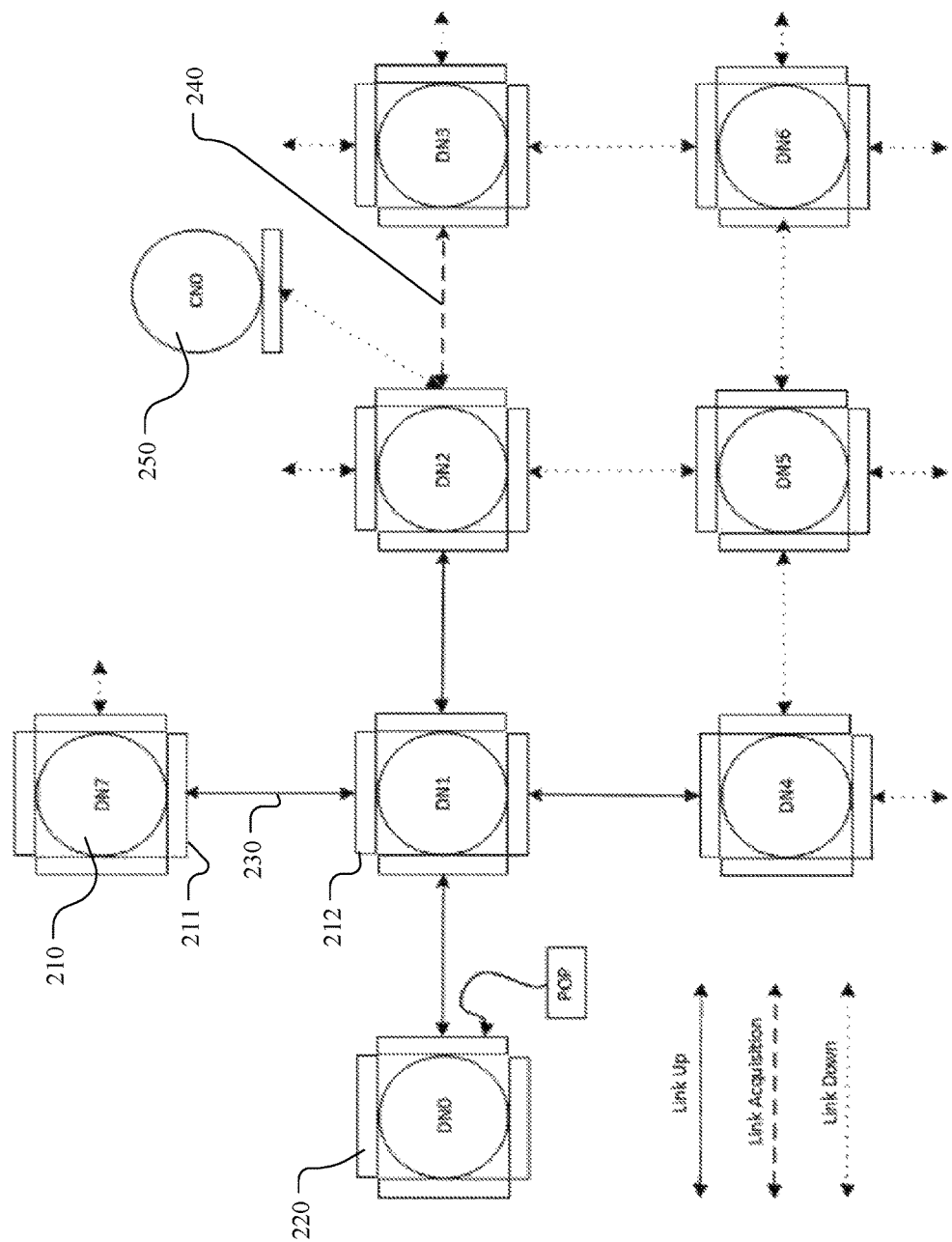
FIG. 2 illustrates example network nodes, sectors, and links in a multi-hop wireless network.

FIG. 2 illustrates example network nodes, sectors, and links in a multi-hop wireless network. Each sector may form a link (e.g. wireless connection) with another sector on a different network node. Illustrated are several distribution nodes 210 and a customer node 250. Each distribution node 310 and client node 250 may have one or more sectors 220. Each sector may include one or more beamforming antennas to form an array of beamforming antennae. As an example and not by way of limitation, if the distribution node labeled DN7 is configured to form a link with DN1, the array of beamforming antennae located in sector 220, may form a link with the array of beamforming antennae located in sector 212. This link may be formed using the method described herein. Link acquisition 240 may illustrate that DN2 and DN3 are in the process of establishing a link. The beamforming antenna arrays on DN2 and DN3 may still be scanning and/or adjusting their beamforming weights until the desired wireless connection is established.

Figure 3:
FIG. 3 illustrates an example point cloud for planning an example multi-hop wireless network.

FIG. 3 illustrates an example point cloud 300 for planning an example multi-hop wireless network. In particular embodiments, the network planning system may access a point cloud similar to point cloud 300 that comprises a plurality of points 310. Each point 310 in the point cloud 300 may correspond to an object located in a region in a three-dimensional space. Each point 310 in the point cloud 300 may contain information about the coordinates of the particular point 310 (e.g., x, y, z coordinates in a 3-D space). In particular embodiments, there may be no labels or annotations on what each point 300 represents. In other words, point cloud 300 may be expressed as a list of unordered points with x, y, z coordinates. To transform the point cloud in data that can be used as input to determine where to place network nodes, the network planning system may apply 3D computer vision algorithms to detect poles (e.g., light poles, electricity poles, traffic lights). In particular embodiments, the point cloud may be generated using LiDAR. LiDAR may stand for "Light Detection and Ranging," "Light Imaging, Detection, and Ranging," or may be a portmanteau of "light and radar." In particular embodiments, the point cloud may be generated by any suitable means that measures distance to a target by illuminating that target with a laser light. Although this disclosure describes accessing a point cloud in a particular manner, this disclosure contemplates accessing a point cloud in any suitable manner.

Figure 4:
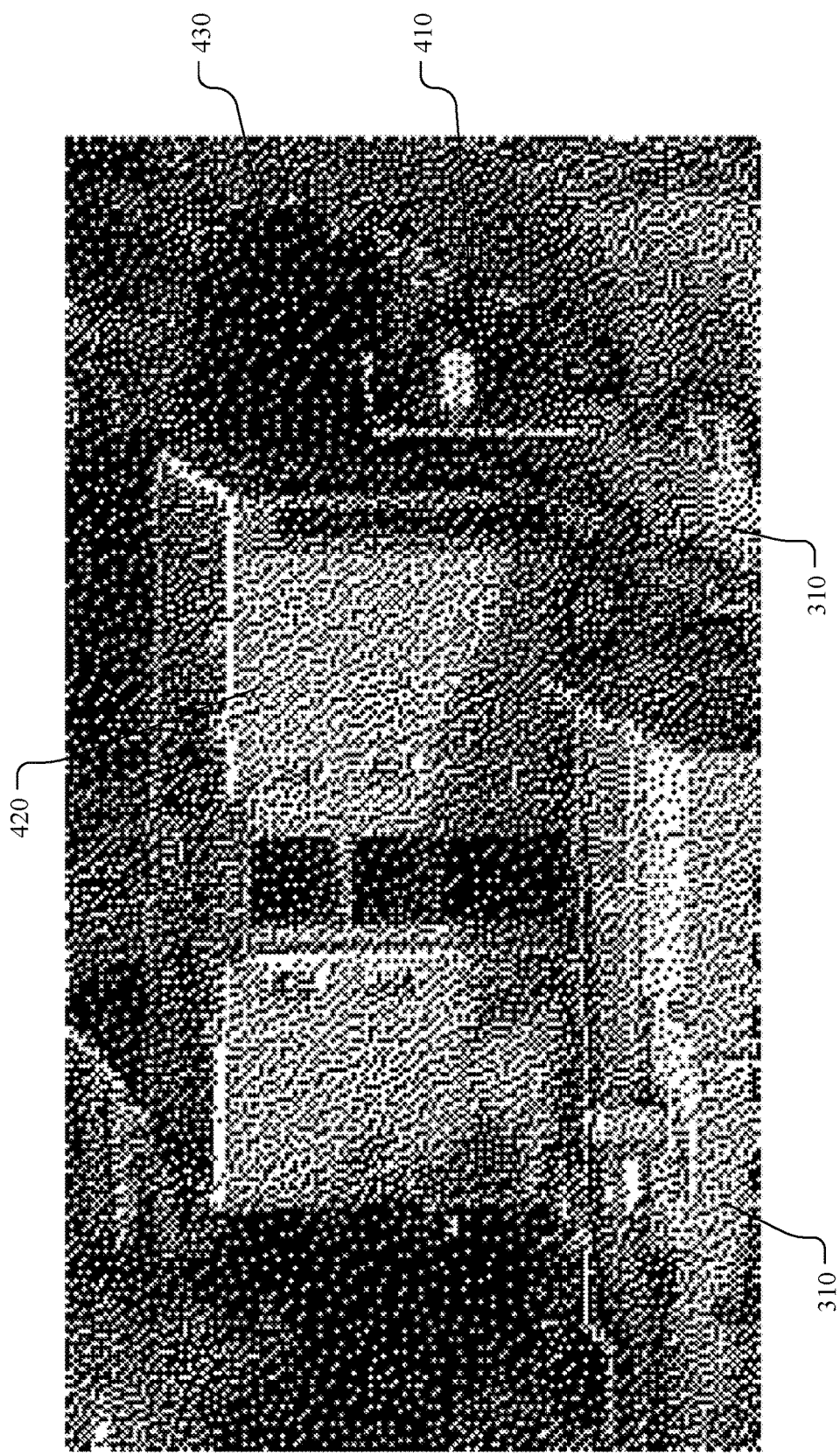
FIG. 4 illustrates an example region of a point cloud.

FIG. 4 illustrates an example region 400 of point cloud 300. Region 400 may comprise one or more linear structures 410 (e.g., light pole), one or more planar structures 420 (e.g., the face of a building), and one or more volumetric structures 430 (e.g., tree). In particular embodiments, the network planning system may not know or recognize which points 310 are part of which structure. As mentioned above, point cloud 300 may be expressed as a list of unordered points with x, y, z coordinates. In particular embodiments, the network planning system may determine whether each point in the point cloud is part of a linear structure, a planar structure, or a volumetric structure. This may enable the network planning system to make sense of the point cloud 300. To determine a classification for each point 310 in point cloud 300, the network planning system may use Principle Component Analysis (PCA). PCA may be a statistical procedure that uses an orthogonal transformation to convert a set of observations of possibly correlated variables into a set of values of linearly uncorrelated variables called principal components. The number of principal components is less than or equal to the smaller of (number of original variables or number of observations). This transformation is defined in such a way that the first principal component has the largest possible variance (that is, accounts for as much of the variability in the data as possible), and each succeeding component in turn has the highest variance possible under the constraint that it is orthogonal to the preceding components. The resulting vectors are an uncorrelated orthogonal basis set. PCA is sensitive to the relative scaling of the original variables. PCA may take all the points in point cloud 300 and may determine whether they are part of a linear structure (e.g., a utility pole), a planar structure (e.g., the side of a building), or a volumetric structure (e.g., a tree). Conceptually, classifying each point 310 may involve taking a given point 310 and examining all the points 310 within a given radius around that point. The points within the radius are searched using a k-d tree. The output of the PCA analysis performed on the points may be three eigenvalues A, B, and C. If B and C are about the same and A is much larger, then the point is part of a linear structure. If A and B are about the same and C is much smaller, then the point is part of a planar structure. If all three eigenvalues are about the same, then the point is part of a volumetric structure. This may be expressed mathematically, wherein the PCA results in three eigenvalues $\lambda_1, \lambda_2, \lambda_3$, wherein a linear structure is characterized by $\lambda_1 \gg \lambda_2 \cong \lambda_3$ a planar structure is characterized by $\lambda_2 \cong \lambda_2 \gg \lambda_3$, and a volumetric structure is characterized by $\lambda_1 \cong \lambda_2 \cong \lambda_3$. The network planning system may be most interested in linear structures because most network nodes may be installed on utility poles, which are linear structures. Although this disclosure describes determining classifications for points in a point cloud in a particular manner, this disclosure contemplates determining classifications for points in a point cloud in any suitable manner.

In particular embodiments, PCA may not distinguish between vertical linear structures and horizontal linear structures. For a linear structure, the dominant eigenvector $v_1$ indicates the direction of the linear distribution, so the network planning system applies the following equation to determine the direction of the linear structure, wherein vertical linear structures are classified as being pole stems:

$$\left| \frac{\vec{v_1}}{\|\vec{v_1}\|} \cdot (0, 0, 1) \right| > \theta_t.$$

Because point cloud 300 may have approximately one billion points 310, computing PCA for every point may be very time consuming. To speed up the process, the network planning system may perform PCA on a subset of sampled points 310. In particular embodiments, only one point is sampled in a radius of 0.5 meters, or in a radius of any suitable length. Although this method may lead to some incorrect point classifications, it likely will not lead to a large error in pole detection and may significantly speed up the point classification process. Although this disclosure describes determining classifications for points in a point cloud in a particular manner, this disclosure contemplates determining classifications for points in a point cloud in any suitable manner.

In particular embodiments, even after points 310 are classified using PCA, points 310 may still be stored in an unordered list. This may make it inconvenient to look up points in a given area because all the points in the entire list must be checked to identify the points within the given area. To make the data more convenient and understandable, the network planning system may hash points 310 into 1m-by-1m grids for easy look-up. Arranged in this way, points 310 may be referred to as grid points. Each grid point may have two hashed IDs using the integer values of UTM-projected x and y coordinates. The elevation z may not be hashed because it may be typically bounded by the building height. A grid segment may then be created, which may store an unordered list with all points 310 corresponding to it, together with the number of points 310 of each type (e.g., linear, planar, volumetric). With the data arranged this way, it may be much easier to look through all points near specific geo-coordinates by simply checking the grid points with the hashed IDs corresponding to coordinates nearby. Although this disclosure describes organizing points in a point cloud in a particular manner, this disclosure contemplates organizing points in a point cloud in any suitable manner.

In particular embodiments, the network planning system may only keep points 310 that are located near streets. This may be because for visual understanding of street objects using ground-based LiDAR point cloud data, it may be advisable to remove any points not close to streets. Points far from streets may have a lower resolution and may be fragmented and noisy, which may lead to false positives in object detection. To determine which points are close to streets and which are far from streets, the network planning system may use street data from Open Street Map (OSM) (openstreetmap.org). For each street in a given area in the Open Street Map data, the network planning system may find all grid centers within a certain distance and may label them as "close." After going through all the streets in the given area, each grid center not marked as close is marked as "far" and is filtered out of the data set. All points stored in a grid may follow the label (close/far) of its grid center. Ground points may also be filtered out at this step. Although this disclosure describes filtering points in a point cloud in a particular manner, this disclosure contemplates filtering point in a point cloud in any suitable manner.

In particular embodiments, with point cloud 300 processed, the network planning system may begin the pole-detection stage of the process. In particular embodiments, the network planning system may identify a plurality of point clusters. Each point cluster may comprise one or more points that are located within a grid segment on a two-dimensional grid derived from the three-dimensional space. A grid segment may be a square (e.g., 1 m-by-1 m square) located on a two-dimensional grid derived from the three-dimensional space. A grid segment may comprise a grid center and may also comprise one or more points 310. In particular embodiments, the network planning system may also determine, for each point cluster, whether the point cluster represents a vertical-linear structure or a portion of a vertical-linear structure. Where points in a cluster share the same x and y coordinates, these points may be labeled as part of a vertical-linear structure. Another label for these points may be "stem points," or points that belong to the stem of a utility or telephone pole. For a given cluster with stem points, the stem points may be merged to create a pole-stem candidate. The pole-stem candidates may be filtered by attributes like height and ground levels obtained from z coordinates of ground points in the grid segment to which the pole-stem candidate belongs, or from nearby grid segments. Once a pole-stem candidate has been identified, nearby points 310 (e.g., points that are within a threshold distance of the vertical-linear structure or portion of the vertical linear structure, such as two meters) may be retrieved to characterize other pole components such as pole arms. The retrieved points may correspond to a location on a non-vertical component of the vertical-linear structure, such as a pole arm. This can be done efficiently using the grid points and by checking all hash ID that are within a certain distance to stem coordinates. This may enable the network planning system to properly identify and characterize pole candidates for planning of the multi-hop wireless network. In particular embodiments, one or more pole-stem candidates may be removed or filtered out of the pool of pole-stem candidates according to one or more constraints including height (e.g., filter poles shorter than 5 meters), accessibility (e.g., filter poles whose base is on the roof of a building), or any other suitable constraint. Although this disclosure describes filtering points in a point cloud in a particular manner, this disclosure contemplates filtering point in a point cloud in any suitable manner.

In particular embodiments, the network planning system may identify one or more point-cluster pairs. A point-cluster pair may be two point clusters representing objects in the three-dimensional space that are within a threshold distance from each other. In particular embodiments, the network planning system may only consider those point clusters that have been labeled as vertical-linear structures. The number of unique pairs P in a set of n vertical-linear structures may be represented as P=n(n−1)/2. As an example and not by way of limitation, the network planning system may identify five point clusters that each represents a vertical-linear structure. These point clusters may represent physical utility poles that are all located within 300 meters of each other in a geographic region (which may be the threshold distance). The number of unique pairs that can be identified from these five point clusters is 10 pairs. If there are 100 clusters that each represents a vertical-linear structure, the number of unique pairs may be 4,950 pairs. Although this disclosure describes identifying point-cluster pairs in a particular manner, this disclosure contemplates identifying point-cluster pairs in any suitable manner.

Figure 5:
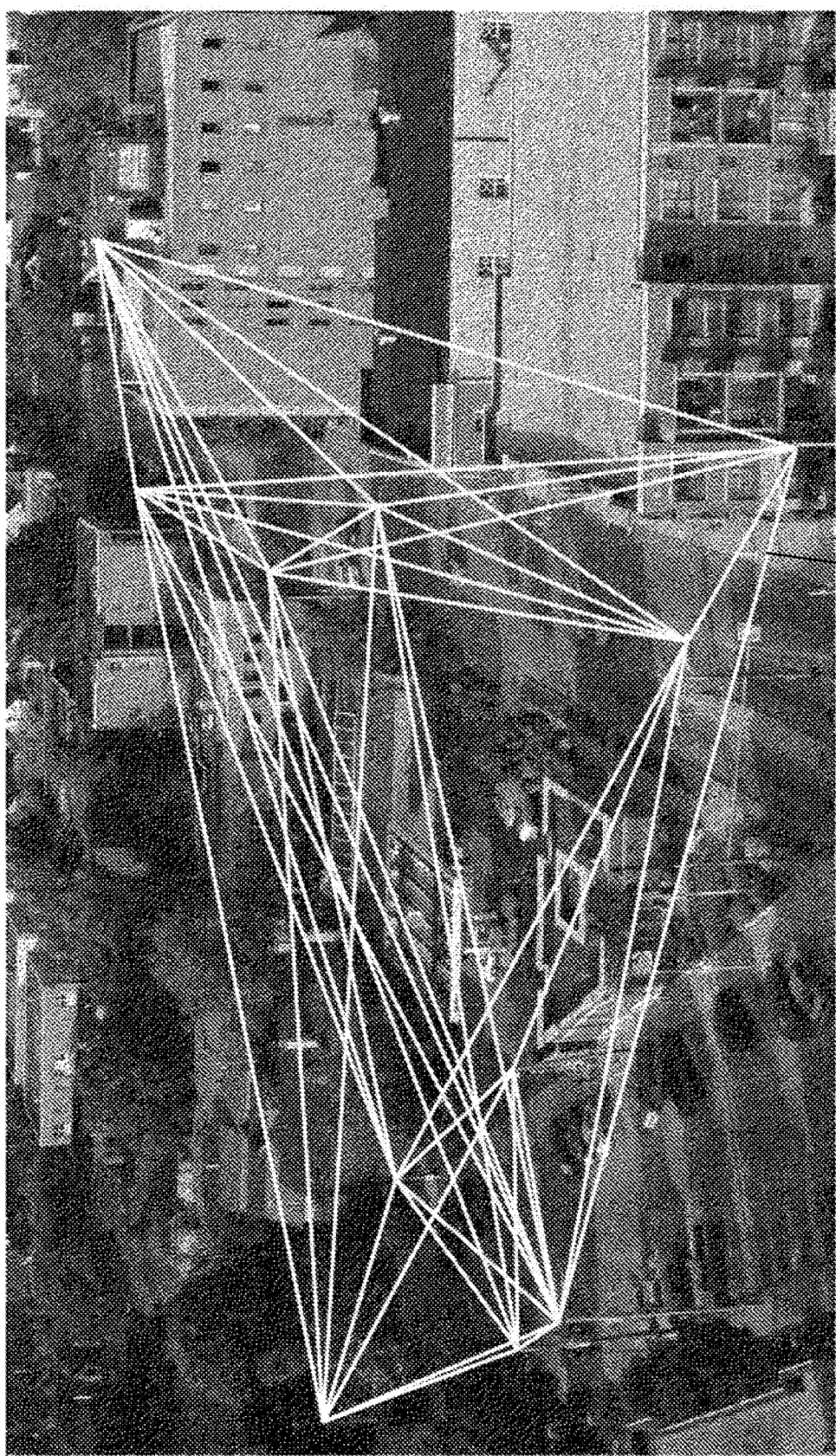
FIG. 5 illustrates an example result of an example line-of-sight analysis performed on an example point cloud.

FIG. 5 illustrates an example result of an example line-of-sight analysis performed on an example point cloud. The example line-of-sight analysis may comprise one or more lines of sight 510 between two vertical-linear structures. For the purposes of this disclosure, it may be assumed that an actual line-of-sight (e.g., a clear path) exists between objects connected by lines of sight 510. In particular embodiments, the network planning system may determine, for each point-cluster pair, whether a line-of-sight exists between each point-cluster in the point-cluster pair. A line-of-sight may exist if there is a clear path between the point-cluster pair. Determining whether a line-of-sight exists may be necessary because the multi-hop wireless network may use millimeter wave technology, which requires a clear path between network nodes for effective communication. Traditionally line-of-sight analysis has been accomplished manually by a human who would climb a utility pole such as a telephone pole and look around to see which other telephone poles in a threshold radius were visible. If another telephone pole in the threshold radius was visible, then a line-of-sight would exist between the two telephone poles. The network planning system may accomplish this algorithmically using a line-of-sight (LoS) analysis. The LoS analysis involves counting, for each point-cluster pair, the number of points 310 at a specified height that are between the point clusters in the point-cluster pair. If less than a threshold number of points 310 exist between the two point clusters, then a line-of-sight exists between the two point clusters. If more than the threshold number of points 310 exist between the two point structures, it may indicate that an object is blocking the line-of-sight between the two point clusters. As an example and not by way of limitation, a tree or a building may stand between two utility poles in the geographic region. This would be detected by the network planning system, using the process described above. In particular embodiments, the network planning system may draw a line between the two point clusters of the point-cluster pair in the three-dimensional space. If more than a threshold number of points 310 intersect or come within a threshold distance to the line, the line-of-sight may be blocked. Counting the points may be done efficiently through the hashed data grid described above because only points 310 located in nearby grid segments need to be checked. The LoS algorithm may be calibrated by adjusting the height and the threshold point count to maximize precision and recall. The LoS algorithm may be able to consider any line-of-sight direction and height to account for all possible signal paths (e.g., by going over short trees or through gaps in buildings). Although this disclosure describes determining whether a line-of-sight exists between point clusters in a particular manner, this disclosure contemplates determining whether a line-of-sight exists between point clusters in any suitable manner.

In particular embodiments, the network planning system may select a plurality of point clusters for antenna sites (e.g., network node sites) for a multi-hop wireless network. The selection may be based at least in part on: (1) whether a line-of-sight exists between a respective point cluster and at least one other point cluster; and (2) one or more demand measures associated with the region in the three-dimensional space. With respect to the first factor, if a line-of-sight does not exist between a point cluster and at least one other point cluster (because, e.g., the utility represented by the point cluster is surrounded by trees), it would be useless to install a network node on that utility pole. With respect to the second factor, demand measures may include the amount of traffic (e.g., foot traffic or predicted Internet traffic) in a particular location; whether a pole represented by a particular cluster has been selected as the location for a PoP node; or any other suitable measure. Although this disclosure describes selecting a plurality of point clusters for antenna sites in a particular manner, this disclosure contemplates selecting a plurality of point clusters for antenna sites in any suitable manner.

In particular embodiments, the network planning system may take the list of potential sites (e.g., point clusters that represent vertical-linear structures) and point-cluster pairs that have a line-of-sight, and may design a network spanned by a subset of the potential sites. To design the network, the network planning system may access additional data such as the location of fiber access PoPs and demand measures. The PoP information may be added by the network planning system as a simple YES/NO attribute to each potential site. Demand may be captured by demand points. Depending on the planned design, demand can be encoded by having demand points representing individual buildings for which there must be connectivity, or by creating a uniform grid (e.g., by placing a demand point every 30 meters). This may provide for blanket coverage. In particular embodiments, the network nodes may have antennas that have a limited operation angle and finite throughput. Thus, each deployed network node may include multiple antennas pointing in different directions. Each of these antennas may be referred to as a sector.

In particular embodiments, the network planning system may model the design of the multi-hop wireless network (e.g., by selecting which potential sites on which to install network nodes) as a network flow problem on a network N (V, A) where the nodes V represent network notes, including DNs, CNs, PoPs, and the demand locations. Each node may be associated with the sectors that are available in it, and network links (e.g., wireless connections between network nodes) may be included for any two sectors that can connect to each other. In particular embodiments, the network planning system may model the design of the multi-hop wireless network as an integer programming (IP) problem. An integer programming problem may be a mathematical optimization or feasibility program in which some or all of the variables are restricted to be integers. In particular embodiments, the integer programming problem may include integer linear programming, in which the objective function and the constraints (other than the integer constraints) are linear. This methodology may allow the network planning system to design a multi-hop wireless network that meets the constraints placed on it by cost, accessibility, transmission capabilities, or any other suitable constraint. Although this disclosure describes designing the multi-hop wireless network in a particular manner, this disclosure contemplates designing the multi-hop wireless network in any suitable manner.

In particular embodiments, the input parameters for the area where the deployment is being considered may include the point clusters (e.g., network node sites), the line-of-sight paths between point clusters, and the following variables:

| Variable | Description |
| --- | --- |
| DN | Set of potential distribution node sites |
| CN | Set of potential client node locations |
| DEM | Set of demand locations (depending on the input configuration, this set may include the buildings that need to be connected, one point in the centroid of each city block, or a uniform grid covering the deployment area) |
| INT | Singleton set containing the source node used in the network flow problem |
| POP | Set of potential fiber PoP locations |
| V | Set of all node sites, defined as CN ∪ DN ∪ POP ∪ DEM ∪ INT |
| $C_i$ | Cost of deployment for location i ∈ V |
| $D_i$ | Demand at demand location i ∈ DEM |
| $A_{DN}$ | Set of all possible connections between DNs |
| A | Set of all possible connections between all nodes in V ($A_{DN}$, which includes DN-DN connections, is augmented with connections between other node types) |
| $T_{ij}$ | Connection throughput between nodes (i, j) ∈ A (maximum transmission capacity if corresponding sectors are used exclusively for this connection) |
| $Q_{ij}$ | Connection quality between nodes (i, j) ∈ A (probability that connection works) |
| $\delta_i$ | Set of potential sectors that can be built on site i ∈ V. For DN-DN and DN-CN connections, the set $\delta_i$ can be thought as a set of possible orientation angles of the sector when mounted on the street furniture. In addition, sectors may include other connections such as WiFi and LTE access points |
| S | Set of potential sectors, defined as $\cup_{i \in V} \delta_i$ |
| $\Gamma_{is}$ | Set of sites that sector s ∈ $\delta_i$ at site i ∈ V can communicate with. Notice that (i, j) ∈ A only if j ∈ $\Gamma_{is}$ for some s ∈ $\delta_i$ |
| $K_{is}$ | Cost of deploying sector s ∈ $\delta_i$ at site i ∈ V |

In particular embodiments, the decision variables used by the IP problem may be given by the following:

| Variable | Description |
| --- | --- |
| $z_i$ | is 1 if site i ∈ V is deployed, 0 otherwise |
| $s_{ia}$ | is 1 if sector a ∈ S on site i ∈ V is deployed, 0 otherwise |
| $f_{ij}$ | flow sent through connection (i, j) ∈ A |
| $m^k_{ij}$ | flow sent through connection (i, j) ∈ A for demand location k ∈ DEM |
| $P_{ij}$ | time division multiplexing at connection (i, j) |

In particular embodiments, both inputs and variables may be combined in the following formulation. One objective may be to minimize the total cost of hardware and operational cost necessary to make all the selected street furniture (e.g., utility poles) viable antenna locations. Letting $C_i$ to be the cost of activating site i ∈V and $K_{is}$ to be the cost of activating sector s ∈$\delta_i$ at site i ∈V, it may be desirable to find the subset of sites and sectors that provide lower total cost:

$$\min \Sigma_{i \in V} C_i z_i + \Sigma_{i \in V} \Sigma_{j \in \delta_i} K_{ij} \delta_{ij}.$$

In particular embodiments, a node in V may be referred to as an INT to represent Internet traffic that goes into the network through the PoPs. This node may include connections in A to all PoPs, or to a subset of PoPs. Variables $f_{ij} \in \mathbb{R}_{\geq 0}$ may denote the flow sent through connection (i, j). These flows may represent valid traffic using flow balance constraints, which state that the total incoming flow is equal to the sum of the total outgoing flow and the demand at that location:

$$\Sigma_{j \in V:(j,i) \in A} f_{ji} = \Sigma_{j \in V:(i,j) \in A} f_{ij} + d_i \quad i \in V \qquad (5)$$

-continued where $$d_i = \begin{cases} D_i, & i \in DEM \\ -M, & i \in INT \\ 0 & \text{otherwise} \end{cases}$$

and $M = \Sigma_{k \in DEM} D_k$. As a result of the flow balance constraints, each demand location $i \in DEM$ may have at least one path to an active PoP that forwards the traffic directed to it.

In particular embodiments, the binary decision variable $z_i \in \{0, 1\}$ may represent if site i is selected to be a part of the final network design. In particular embodiments, a site may only have nonzero incoming or outgoing flow when it is active:

$\Sigma_{j \in V} f_{ij} \leq M z_i$, $i \in V$

This formulation may satisfy demand at minimum cost. It may be assumed that demand locations are always active: $z_k = 1$ for $k \in DEM$.

In particular embodiments, sectors may need to be selected to enable connections between sites. A nonzero flow $f_{ij}$ from site i to site j may be achieved if the corresponding sector a at site i is deployed. In addition, a sector at a potential DN or POP site i may be activated if site i is also active.

$\Sigma_{j \in \Gamma_{ia}} f_{ij} \leq M \delta_{ia}$, $i \in V$, $a \in \delta_i$ $\Sigma_{j \in \Gamma_{ia}} f_{ji} \leq M \delta_{ia}$, $i \in V$, $a \in \delta_i$ $\delta_{ia} \leq z_i$, $i \in DN \cup POP$, $a \in \delta_i$.

In particular embodiments, the next set of constraints may encode the requirements for CN connectivity coming from the design of the multi-hop wireless network. At potential CN locations that are active, it may be assumed that there is one sector connecting to a demand location and one sector connecting to another DN or PoP. The following constraints may ensure that in an active CN i, the number of sectors facing a DN/PoP may be one, and that the number of sectors facing a demand location may be one.

$\Sigma_{a \in \delta_i : |(DN \cup POP) \cap \Gamma_{ia}| \geq 1} \delta_{ia} \leq Z_i$, $i \in CN$ $\Sigma_{a \in \delta_i : |(DEM \cap \Gamma_{ia}| \geq 1} \delta_{ia} \leq Z_i$, $i \in CN$ In particular embodiments, each demand location k may be covered by one CN location. This may be used to select the best CN among alternatives to connect to a building. This may be expressed in the following equation:

$\Sigma_{i \in CN:(i,k) \in A} Z_i \leq 1$, $k \in DEM$

In particular embodiments, if a point-to-multipoint configuration is used, network node sectors may send and receive transmissions using time division multiplexing (TDM). TDM may be modeled using decision variables $p_{ij} \in \mathbb{R}_{\geq 0}$ that represent the fraction of time i uses to transmit to j. It may be assumed that a connection $(i, j) \in A$ may be done using a unique pair of sectors in i and j.

$f_{ij} \leq p_{ij} T_{ij}$, $(i, j) \in A$ $\Sigma_{j \in \Gamma_{ia}} P_{ij} \leq \delta_{ia}$, $i \in V$, $a \in \delta_i$ $\Sigma_{j \in \Gamma_{ia}} P_{ij} \leq \delta_{ia}$, $i \in V$, $a \in \delta_i$.

The above constraints may state that the flow on connection $(i, j)$ may not exceed its effective throughput. For a sector a at site i, the above constraints may state that the TDM fractions may not exceed 100%. The constraints may be merged into one if transmission and reception cannot be done at the same time. In particular embodiments, if sector a is not active, these constraints may prevent transmissions between i and j.

In particular embodiments, sites may have polarities, which may be used to decrease the interference caused by other signals over the area. Ideally, the designed network may form a bipartite graph and sites may belong to two distinct classes without transmissions among sites belonging to the same class. The two polarities may be used by a central controller to synchronously transmit from sites with one polarity in one period and from sites with the other polarity in a following period. This may be understood to be a version of graph-theory called the graph coloring problem. The following set of constraints assign a polarity to each site such that no adjacent sites i and j may have the same polarity. Let $r_i$ and $b_i$ be the binary decision variables representing the two possible colors of a site i 531 DN $\cup$POP. When the site is deployed, one of those variables may be set to 1 to designate the corresponding color.

$r_i + b_i = z_i$, $i \in DN \cup POP$ $p_{ij} \leq r_i + r_j$, $(i, j) \in A$, $i, j \in DN \cup POP$ $p_{ij} \leq b_i + b_j$, $(, j) \in A$, $i, j \in DN \cup POP$ These constraints may ensure that two sites that have direct communication have different color assignments.

In particular embodiments, the multi-hop wireless network may need to be provisioned with service quality exceeding the minimum requirements. The probability of all demand locations can be successfully connected may be approximated by taking the weighted average of the log likelihood and constrain this to be above a threshold. In particular embodiments, the average latency (as represented by the number of hops between PoPs and demand locations) may be limited by the following:

$\Sigma_{i,j \in CN \cup DN \cup POP} \log(Q_{ij})(f_{ij}/M) \geq \log(1-\alpha)$ $\Sigma_{i,j \in CN \cup DN \cup POP} (f_{ij}/M) \leq H$, where $1-\alpha$ is a threshold for the minimum probability of providing connectivity to all demand locations, and H is the maximum number of hops that a signal can travel. Both of these constants are tuning parameters that are set to ensure that the quality of service of the resulting solution is appropriate for the deployment that is being planned.

In particular embodiments, the formulation may be flexible enough to consider the case where there is a fixed budget B for the deployment, and the network is built to maximize the connection coverage. There may be several ways to model this approach. In particular embodiments, the total units of unsatisfied demand may be minimized to avoid additional binary variables. Let $y_k \in [0, D_k] \subset \mathbb{R}$ be the amount of unsatisfied demand at location $k \in DEM$. The resulting objective function may be $\text{Min} \Sigma_{k \in DEM} y_k$.

The values of $y_k$ may be defined by a modified flow balance constraint for demand nodes:

$\Sigma_{j \in V} f_{jk} = \Sigma_{j \in V} F_{kj} = D_k - y_k$, $k \in DEM$.

The budget constraint may then be added:

$$\sum_{i \in V} C_i z_i + \sum_{i \in V} \sum_{a \in \delta_i} = K_{ia\delta ia} \leq B.$$

Figure 6:
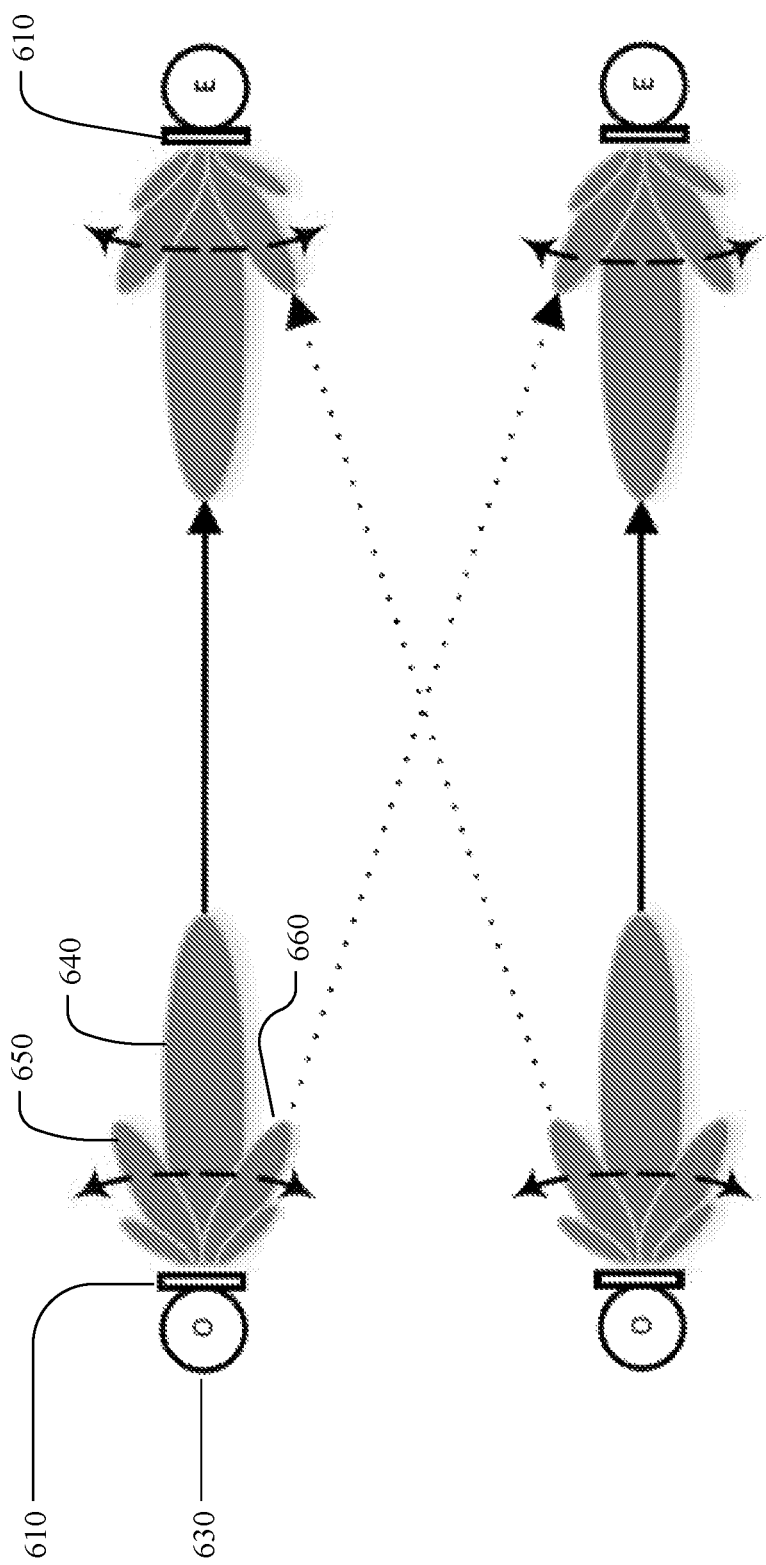
FIG. 6 illustrates example beamforming.

FIG. 6 illustrates example beamforming. In the example of FIG. 6, each network node 630 (which may be a DN 160 or a CN 170) includes a sector 610. Each sector 610 includes an array of beamforming antennas. To aim sector 610 for transmission, a processor in a network node 610 may instruct a beamformer in network node 630 to selectively weight or delay signals transmitted by the antennas of the sector 610 to aim main lobe 640 of the transmission in a desired direction. In addition to transmitting in the direction of main lobe 640, sector 610 may also transmit weaker signals in the directions of side lobes 650 and 660, which may interfere with other transmissions, as shown by the dotted directional lines in FIG. 6. To aim sector 610 for reception, a processor in network 630 may weigh, delay, or sum signals received by the antennas of sector 610. Although this disclosure describes aiming a beamforming antenna in a particular manner, this disclosure contemplates aiming a beamforming antenna in any suitable manner.

Figure 7:
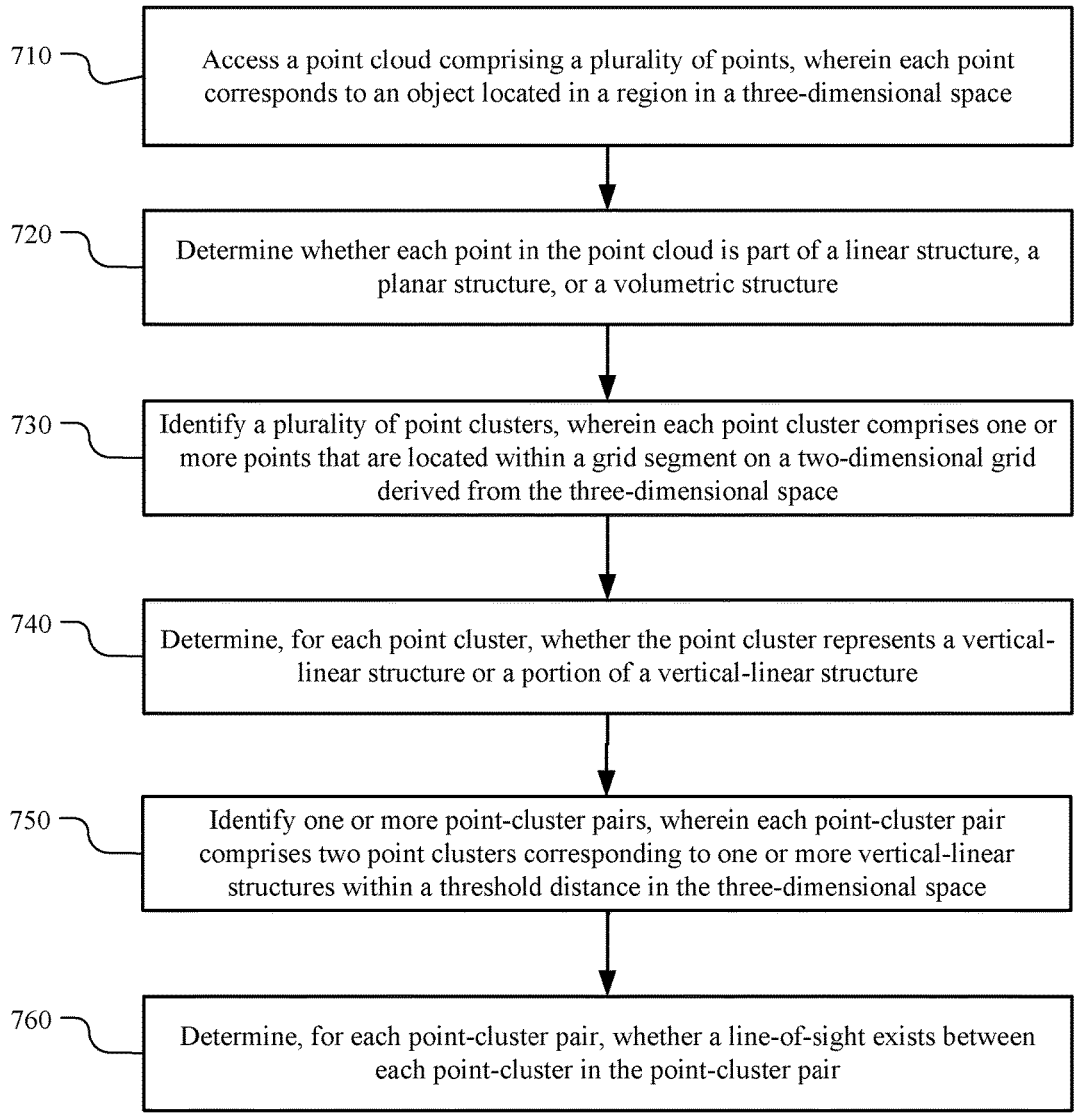
FIG. 7 illustrates an example method for planning an example multi-hop wireless network.

FIG. 7 illustrates an example method 700 for planning an example multi-hop wireless network. The method may begin at step 710, where the network planning system may access a point cloud comprising a plurality of points, wherein each point corresponds to an object located in a region in a three-dimensional space. At step 720, the network planning system may determine whether each point in the point cloud is part of a linear structure, a planar structure, or a volumetric structure. At step 730, the network planning system may identify a plurality of point clusters, wherein each point cluster comprises one or more points that are located within a grid segment on a two-dimensional grid derived from the three-dimensional space. At step 740, the network planning system may determine, for each point cluster, whether the point cluster represents a vertical-linear structure or a portion of a vertical-linear structure. In particular embodiments, the network planning system may additionally retrieve points corresponding to surfaces of one or more components of the vertical-linear structure (e.g., an arm of a utility pole). In particular embodiments, the network planning system may determine whether the vertical-linear structure is a pole by applying one or more filtering constraints (e.g., height constraint). At step 750, the network planning system may identify one or more point-cluster pairs, wherein each point-cluster pair comprises two point clusters corresponding to one or more vertical-linear structures within a threshold distance in the three-dimensional space. At step 760, the network planning system may determining, for each point-cluster pair, whether a line-of-sight exists between each point-cluster in the point-cluster pair. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for planning an example multi-hop wireless network including the particular steps of the method of FIG. 7, this disclosure contemplates any suitable method for planning an example multi-hop wireless network including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
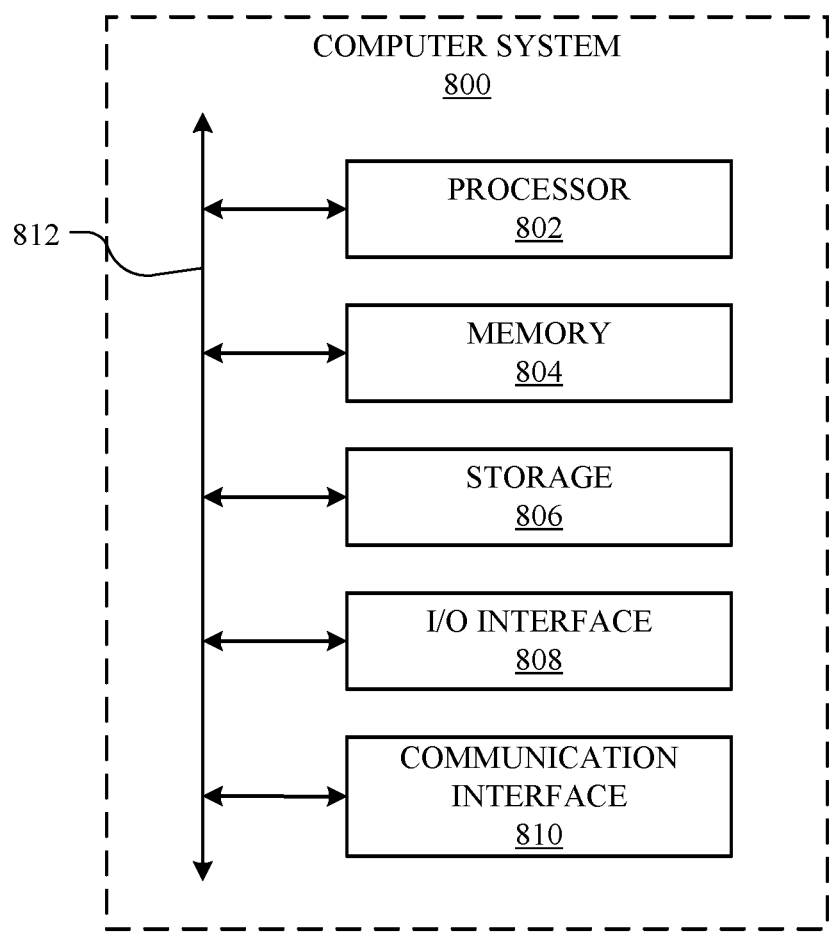
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
   identifying, from a point cloud comprising a plurality of point-cloud points, a first set of point clusters, wherein the point cloud is generated by measuring the distance from an initial measuring point to each point-cloud point, wherein each point-cloud point corresponds to a location on a surface of an object located in a region in a three-dimensional space,
   and wherein each point cluster comprises one or more point-cloud points that are located within a grid segment on a two-dimensional grid derived from the three-dimensional space;
   determining, for at least a plurality of point clusters from the first set of point clusters, that each point cluster represents a vertical-linear structure or a portion of a vertical-linear structure; and
   identifying one or more point-cluster pairs from the plurality of point clusters, wherein each point-cluster pair is identified based on the two point clusters having (1) a separation distance within a threshold distance in the three-dimensional space and
   (2) a line-of-sight connection in the three-dimensional space.

2. The method of claim 1, wherein determining that each point cluster of the plurality of point clusters represents a vertical-linear structure or a portion of a vertical-structure is done using Principle Component Analysis (PCA).

3. The method of claim 2, wherein the PCA results in three eigenvalues $\lambda_1$, $\lambda_2$, $\lambda_3$, wherein:
   a linear structure is characterized by $\lambda_1 \gg \lambda_2 \cong \lambda_3$;
   a planar structure is characterized by $\lambda_1 \cong \lambda_2 \gg \lambda_3$; and
   a volumetric structure is characterized by $\lambda_1 \cong \lambda_2 \cong \lambda_3$.

4. The method of claim 1, wherein a line-of-sight connection exists between two point clusters in a point-cluster pair if a number of point-cloud points between the two point clusters is below a threshold number.

5. The method of claim 1, wherein the point cloud is obtained using light detection and ranging (LiDAR).

6. The method of claim 1, further comprising:
   for each point cluster determined to represent a vertical-linear structure or portion of the vertical-linear structure, applying one or more filter constraints to determine that the vertical-linear structure or portion of the vertical-linear structure is a utility pole or portion of a utility pole, respectively.

7. The method of claim 6, further comprising:
   retrieving one or more point-cloud points that are within a threshold distance of the vertical-linear structure or portion of the vertical-linear structure, wherein the one or more retrieved point-cloud points correspond to a location on a non-vertical component of the utility pole.

8. The method of claim 1, further comprising:
   selecting a plurality of point clusters for antenna sites for a multi-hop wireless network, the selection based at least in part on:
   whether a line-of-sight connection exists between a respective point cluster and at least one other point cluster; and
   one or more demand measures associated with the region in the three-dimensional space.

9. The method of claim 8, wherein the one or more demand measures comprise a set of point clusters that have been determined to require a network antenna.

10. The method of claim 8, wherein the one or more demand measures comprise an amount of traffic at one or more locations within the region in the three-dimensional space.

11. One or more computer-readable non-transitory storage media embodying software that is operable when executed to:
identify, from a point cloud comprising a plurality of point-cloud points, a first set of point clusters, wherein the point cloud is generated by measuring the distance from an initial measuring point to each point-cloud point, wherein each point-cloud point corresponds to a location on a surface of an object located in a region in a three-dimensional space,
and wherein each point cluster comprises one or more point-cloud points that are located within a grid segment on a two-dimensional grid derived from the three-dimensional space;
determine, for at least a plurality of point clusters from the first set of point clusters, that each point cluster represents a vertical-linear structure or a portion of a vertical-linear structure; and
identify one or more point-cluster pairs from the plurality of point clusters, wherein each point-cluster pair is identified based on the two point clusters having (1) a separation distance within a threshold distance in the three-dimensional space and (2) a line-of-sight connection in the three-dimensional space.

12. The media of claim 11, wherein determining that each point cluster of the plurality of point clusters represents a vertical-linear structure or a portion of a vertical-structure is done using Principle Component Analysis (PCA).

13. The method of claim 2, wherein the PCA results in three eigenvalues $\lambda_1, \lambda_2, \lambda_3$, wherein:
a linear structure is characterized by $\lambda_1 \gg \lambda_2 \cong \lambda_3$;
a planar structure is characterized by $\lambda_1 \cong \lambda_2 \gg \lambda_3$; and
a volumetric structure is characterized by $\lambda_1 \cong \lambda_2 \cong \lambda_3$.

14. The media of claim 11, wherein a line-of-sight connection exists between two point clusters in a point-cluster pair if a number of point-cloud points between the two point clusters is below a threshold number.

15. The media of claim 11, wherein the point cloud is obtained using light detection and ranging (LiDAR).

16. The media of claim 11, wherein the software is further operable when executed to:
for each point cluster determined to represent a vertical-linear structure or portion of the vertical-linear structure, apply one or more filter constraints to determine that the vertical-linear structure or portion of the vertical-linear structure is a utility pole or portion of a utility pole, respectively.

17. The media of claim 16, wherein the software is further operable when executed to:
retrieve one or more point-cloud points that are within a threshold distance of the vertical-linear structure or portion of the vertical-linear structure, wherein the one or more retrieved point-cloud points correspond to a location on a non-vertical component of the utility pole.

18. The media of claim 11, wherein the software is further operable when executing the instructions to:
select a plurality of point clusters for antenna sites for a multi-hop wireless network, the selection based at least in part on:
whether a line-of-sight connection exists between a respective point cluster and at least one other point cluster; and
one or more demand measures associated with the region in the three-dimensional space.

19. The media of claim 18, wherein the one or more demand measures comprise a set of point clusters that have been determined to require a network antenna.

20. A system comprising: one or more processors; and a memory coupled to the processors comprising instructions executable by the processors, the processors being operable when executing the instructions to:
identify, from a point cloud comprising a plurality of point-cloud points, a first set of point clusters, wherein the point cloud is generated by measuring the distance from an initial measuring point to each point-cloud point, wherein each point-cloud point corresponds to a location on a surface of an object located in a region in a three-dimensional space,
and wherein each point cluster comprises one or more point-cloud points that are located within a grid segment on a two-dimensional grid derived from the three-dimensional space;
determine, for at least a plurality of point clusters from the first set of point clusters, that each point cluster represents a vertical-linear structure or a portion of a vertical-linear structure; and
identify one or more point-cluster pairs from the plurality of point clusters, wherein each point-cluster pair is identified based on the two point clusters having (1) a separation distance within a threshold distance in the three-dimensional space and
(2) a line-of-sight connection in the three-dimensional space.

* * * * *